H. H. EATON.
CUTTING MACHINE.
APPLICATION FILED FEB. 4, 1916.

1,337,208.

Patented Apr. 20, 1920.

INVENTOR.

H. H. EATON.
CUTTING MACHINE.
APPLICATION FILED FEB. 4, 1916.

1,337,208.

Patented Apr. 20, 1920.
6 SHEETS—SHEET 6.

INVENTOR.
Harrison H. Eaton
By his Attorney
Nelson H. Howard

UNITED STATES PATENT OFFICE.

HARRISON H. EATON, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

CUTTING-MACHINE.

1,337,208.          Specification of Letters Patent.      Patented Apr. 20, 1920.

Application filed February 4, 1916. Serial No. 76,175.

*To all whom it may concern:*

Be it known that I, HARRISON H. EATON, a citizen of the United States, residing at Beverly, in the county of Essex and State of Massachusetts, have invented certain Improvements in Cutting-Machines, of which the following description, in connection with the accompanying drawings, is a specification, like reference characters on the drawings indicating like parts in the several figures.

This invention relates to machines for making articles from strips of material, and will be herein disclosed as embodied in a machine designed especially to make shank pieces for boots and shoes.

It is a common practice in the manufacture of boots and shoes to insert in the shank portion of the shoe between the inner and outer soles a member having sufficient strength and stiffness to reinforce this portion of the shoe. These members are called in the trade "shank pieces" or "shanks." A substantial percentage of such shanks are made of wood, the usual process of manufacture consisting in first forming, with a machine well known in this art, a strip of veneer of the thickness required for the shanks and of a width equal to the length of the shanks required. The grain in this strip of veneer runs crosswise from edge to edge; and the shanks are made by cutting this strip in a direction substantially parallel to the grain into pieces of the proper width to form shanks. Sometimes each shank is of uniform width and is known as a "straight" shank, while at other times it is wider at one end than at the other and is called a "tapered" shank. The veneer usually is curved laterally in a plane transverse to its length to give it the arch or curvature which it is desirable for the shank to have.

While machines have been proposed heretofore for automatically cutting a strip of veneer of this character to form shanks, and such machines are now in use, they are unsatisfactory in many particulars; and the present invention is directed especially to meeting the practical requirements of a machine for making shanks and similar articles. It is the general object of the invention to improve and render more substantial and efficient the machines of this type. Stated more specifically, the invention aims to devise a machine of this character which will be less liable to split the veneer than those now in use; with which either tapered or straight shanks can be made with equal facility; which will accurately separate the chips and the shanks; which can be easily controlled; and in which the path of travel of the material through the machine shall be readily accessible for the purpose of clearing this path whenever necessary.

The manner in which it is proposed to accomplish these objects and the various features of the invention will be readily understood from the following description of the embodiment thereof now preferred by me, reference being made to the accompanying drawings, in which—

Figure 1:
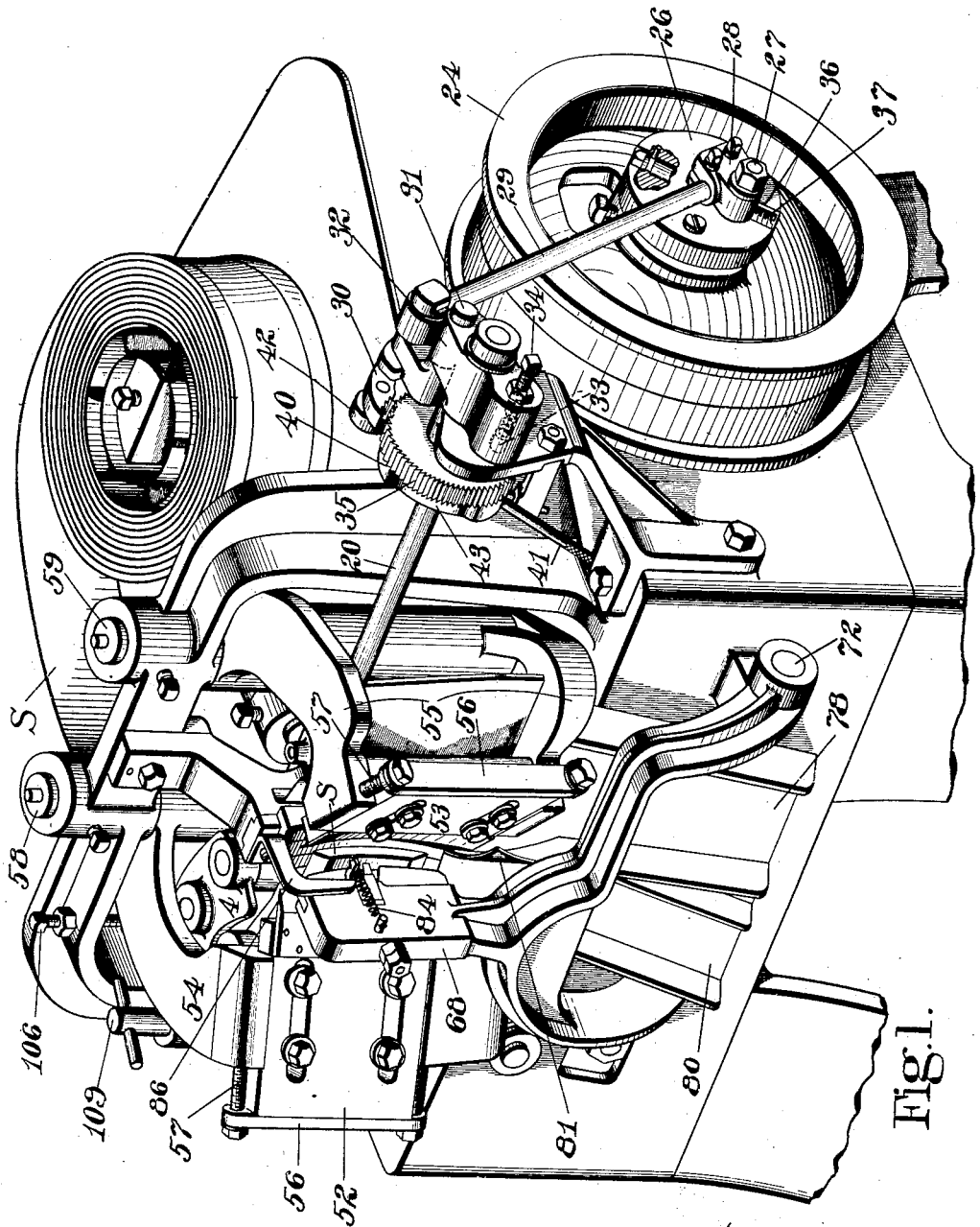
Figure 1 is a perspective view of a machine showing this embodiment of the invention, certain parts of the frame, however, being broken away.

The machine shown in the drawings comprises a feeding mechanism that advances intermittently the strip of veneer or other material from which the shanks or like articles are to be formed, and a cutting mechanism to which the strip of material is fed by said mechanism. The strip S of veneer comes to the machine in the form of a coil, as clearly shown in Fig. 1, and this coil is supported on a table 2, which is mounted on a bracket or frame piece 4 (see Fig. 2) that is supported by the main frame of the machine. The end of the strip S is led through the feeding mechanism, as indicated in dotted lines in Fig. 2, and passes between a pair of opposed driven feed rolls 5 and 6, respectively, mounted to bear on opposite sides of the strip S, and also between another driven feed roll 7 which bears on the inner face of the strip, and a vertical series of idle rolls 8 that bear on the outer face of the strip S opposite the roll 7. As shown in Fig. 2, all the rolls 5, 6 and 7 are mounted on shafts which carry gears by means of which the rolls are driven. The gears for the two rolls 5 and 6 mesh with each other and the gear of the roll 5 is driven by a pinion 10, which meshes with the gear that rotates with the roll 7. The latter gear is driven by a gear 12 mounted fast on a short, vertical shaft 14 which carries a bevel gear 16 that meshes with another bevel gear 18, mounted fast on a horizontal shaft 20. The bearings carrying the shafts for all these gears, except the bevel gear 18, are formed in or are supported by the bracket 4, but the bearings for the shaft 20, on which the bevel gear 18 is mounted, are supported in the main frame of the machine.

Figure 2:
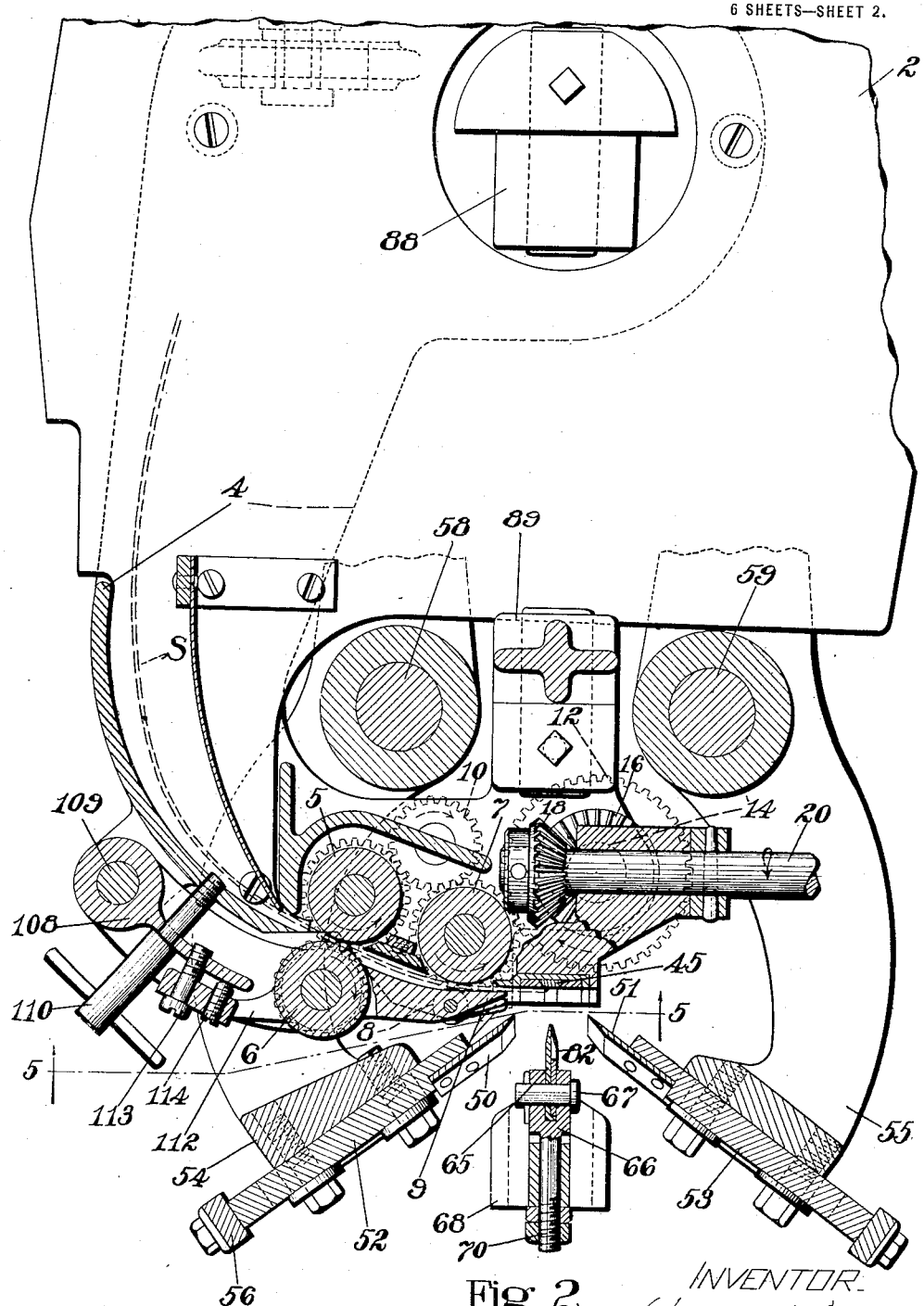
Fig. 2 is a horizontal, cross sectional view taken substantially on the plane indicated by the line 2—2, Fig. 5.
Figure 3:
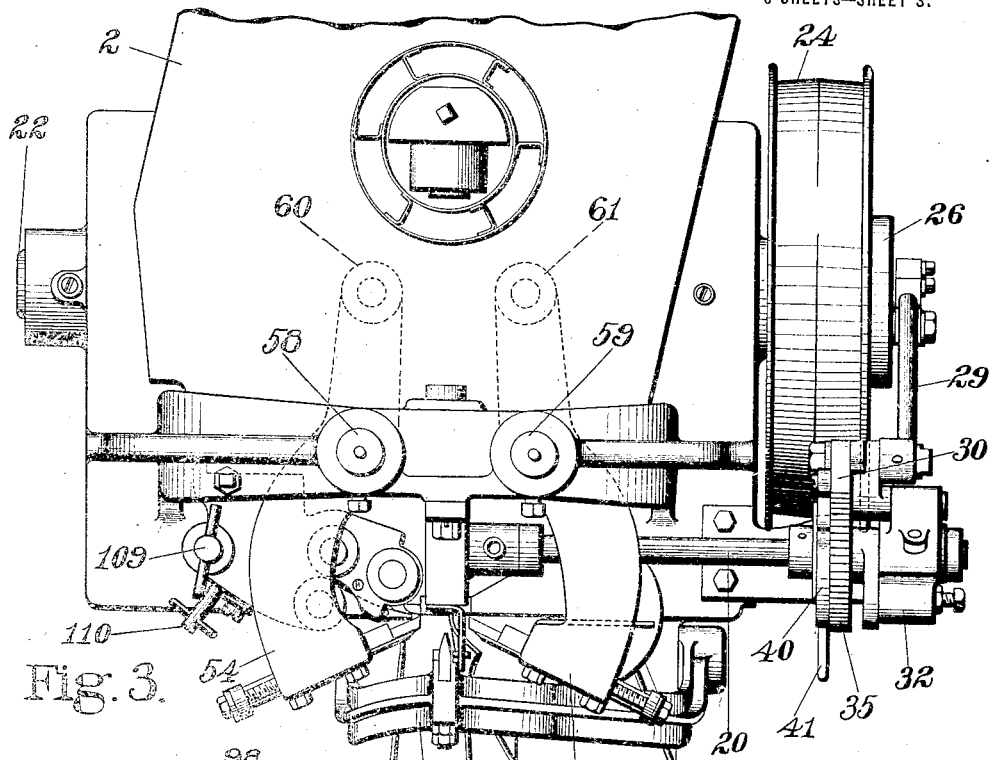
Fig. 3 is a plan view of the machine, certain parts of the work supporting table, however, being omitted.

The shaft 20 is rotated intermittently by a pawl and ratchet mechanism driven from the main shaft 22 of the machine (see Figs. 1 and 3). This shaft has fixed thereto a pulley 24 (Fig. 1) by means of which the machine may be belted to any convenient source of power. Mounted fast on the main shaft, and close beside the pulley 24, is a disk 26 carrying an eccentric stud 27 rotatable in a block 28 to which one end of an eccentric rod 29 is clamped. The other end of this rod is pivoted to a pawl 30, which is itself pivoted at 31 on a block or rocker arm 32, loosely mounted on the end of the shaft 20. This rocker arm has mounted in it, at the side of its axis opposite the pivot 31, a spring pressed plunger 33 and an adjustable bolt 34 that backs up the spring bearing on this plunger. The plunger bears against a plate projecting from the bearing for the shaft 20, as clearly shown in Fig. 1, and acts as a friction device tending to prevent, or exert a drag on, the movement of the rocker arm 32 about the shaft 20. This shaft also has fast thereon a ratchet wheel 35, with which the teeth of the pawl 30 can engage. Certain features of the pawl and ratchet mechanism herein shown are more fully described and claimed in United States Patent No. 1,187,415, granted on June 13, 1916 upon the application of W. C. Baxter.

It will be evident, from an inspection of Fig. 1, that the upward stroke of the eccentric rod 29 will first swing the pawl 30 about its pivot 31 which, being located at one side of the axis of the shaft 20, will carry the teeth of the pawl into engagement with the teeth of the ratchet wheel 35. During the rest of this upward movement the pawl will rotate the ratchet wheel, and consequently the shaft 20, the rocker arm 32 rotating about the shaft 20 to permit this movement. As soon, however, as the eccentric rod starts on its downward stroke, it will first tip the pawl 30 about its pivot 31 until its teeth disengage the teeth of the wheel 35, and then will turn the rocker arm 32 about its axis, thus returning the parts to their original positions. This intermittent rotative movement of the shaft 20 is transmitted through the train of gears above described to the feed rolls 5, 6 and 7, rotating them in directions that cause them to advance the strip S of veneer step by step to the cutting mechanism.

It is desirable to be able to adjust the extent of each feeding movement of the feed rolls in accordance with the width of the shanks desired, and this object is accomplished by varying the throw or length of stroke of the eccentric rod 29. For this purpose the eccentric pin 27 is mounted rigidly in a block which is adjustable in a dovetailed guideway 36, extending radially of the disk 26, and a bolt 37, threaded through this block and rotatable in the disk but held against movement longitudinally of the guideway, serves to adjust the block radially of the disk, and, therefore, to vary the throw of the eccentric rod.

In order to place the feeding mechanism within the convenient control of the workman, a cam disk 40 is mounted loosely on the shaft 20 beside the ratchet wheel 35, and is provided with a handle 41 that projects forward toward the front of the machine. A roll 42, loosely mounted on a pin projecting laterally from the pawl 30, rides on the periphery of the disk 40 when it is in the position in which it is shown in Fig. 1, and in this position the disk and roll hold the pawl out of engagement with the teeth of the ratchet wheel 35. Accordingly, the feeding mechanism is inoperative at this time. When, however, the handle 41 is swung upwardly, a long notch or low portion 43 of the disk is brought under the path of travel of the roll 42 and this part of the disk is made so low that it can not engage the roll 42. Accordingly, the pawl and ratchet mechanism is, at this time, allowed to operate in its normal manner. This mechanism enables the operative to stop the feeding of the work, whenever desired for any reason, without interfering with the operation of the rest of the machine.

Figure 4:
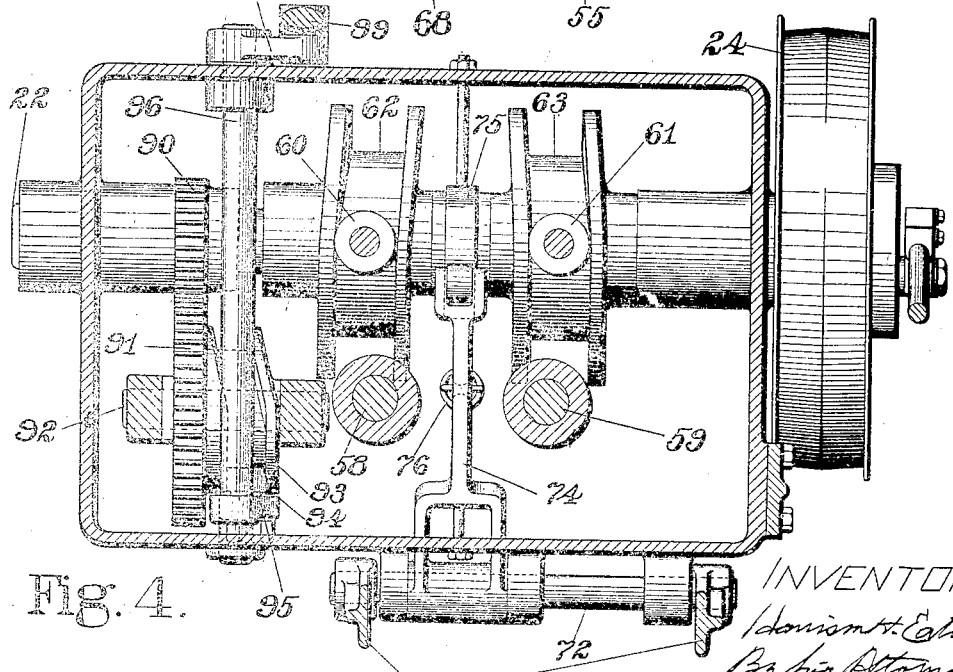
Fig. 4 is a horizontal, cross sectional view on the line 4—4, Fig. 5.
Figure 7:
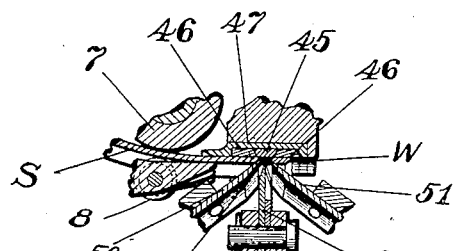
Fig. 7 is a cross sectional view taken on a horizontal plane showing the knives cutting through the veneer.
Figure 10:
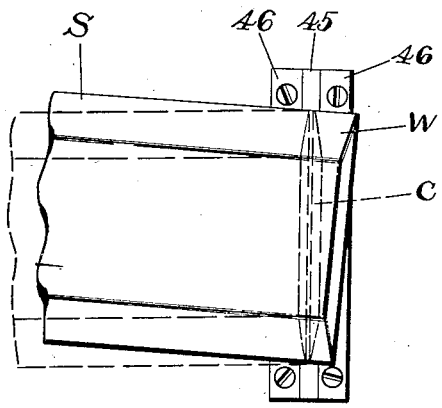
Fig. 10 is a front elevation of a strip of veneer showing the manner in which it is angled to form a tapered shank.

The feeding mechanism above described operates at each rotation of the main shaft of the machine to feed a predetermined length of the strip S across the face of a cutting block 45. This block preferably is made of some soft metal, such for instance as copper, which will not dull the knives that cut against it, and in the arrangement shown, is given the form of a dovetailed piece secured by gibs 46 (see Figs. 7 and 10) in a suitable holder 47, which is bolted into a socket or recess formed for it in the machine frame. Coöperating with this cutting block are two knives 50 and 51, respectively, mounted on knife holders 52 and 53, respectively, adjustably secured to the forward ends of knife operating levers 54 and 55, respectively. Each of the knife holders is slotted to receive bolts by which it is secured to the face of its lever, and each holder is backed up by a plate 56, through the opposite ends of which bolts 57 extend and are threaded into the respective lever arms. This construction permits the accurate adjustment of each knife 50 and 51 relatively to the cutting block. The levers 54 and 55 are fulcrumed on rock shafts 58 and 59, respectively, supported vertically in suitable bearings formed in the machine frame; and they carry at their rearward ends rolls 60 and 61, respectively (see Figs. 3 and 4), which run in paths formed for them in cams 62 and 63, respectively, mounted fast on the main shaft 22 of the machine. These cams are designed to swing the forward ends of the levers 54 and 55 simultaneously toward and from each other and thus to move the knives 50 and 51 both toward and from a single line of cut lying substantially at or very slightly back of the face of the cutting block 45. The edges of these knives are shaped to conform substantially to the contour of the cutting block so that they practically meet at the face of this block after they have cut entirely through the strip of veneer. The positions of the knives at this time are indicated in Fig. 7. The knives thus cut out of the strip of veneer a small chip C, Fig. 7, wedge-shaped in cross section and lying between the knives; and they also form a shank W which lies at the right of the knife 51, as shown in Fig. 7. This arrangement of knives gives to the opposite edges of the shank the beveled shape that is desirable.

In order to facilitate the cutting operation a presser blade 65 is positioned between the knives 50 and 51 and is arranged to bear on the outer face of the strip of veneer at a point between the knives while the knives cut through the strip in the manner just described. This blade is moved toward and from the strip substantially in unison with the knives 50 and 51 and for this purpose it is mounted in a holder 66, which is supported in the upper end of a lever 68. The blade holder 66 consists of a bolt 70 that extends through the lever 68 and is secured thereto by nuts. This bolt has a head slotted to receive the blade 65 and a stud 67 secures the blade in said slot. Upper and lower set screws 71, Fig. 9, threaded through the lever 68, bear against the blade 65 near its opposite ends and coöperate with the holder 66 in clamping the blade in the lever 68. The edge of the blade 65 is shaped to conform substantially to the contour of the outer face of the strip of veneer against which it bears. The lever 68 is moved to swing the blade against the strip of veneer at substantially the same time, or slightly before, the knives 50 and 51 enter the veneer; and the blade maintains its contact with the veneer until the cutting operation has been completed and the knives begin to withdraw. For this purpose the lever 68, which is forked, as indicated in Fig. 1, is mounted fast on a rock shaft 72 (Fig. 4) to which also is fixed an arm 74, which carries a roll that runs on the periphery of a cam 75 mounted fast on the main shaft 22 between the two cams 62 and 63. A strong spring 76 is connected at one end to the arm 74 and at its opposite end to a stationary part of the machine frame and holds the roll in contact with the cam 75. The cam, therefore, is effective through the connections just described to swing the upper end of the lever 68, and consequently the blade 65, away from the cutting block 45, while the spring 76 swings the blade 65 toward the cutting block when permitted to do so by the cam 75. The blade 65 thus is pressed yieldingly against the strip of veneer during the cutting operation through the action of the spring 76.

Figure 5:
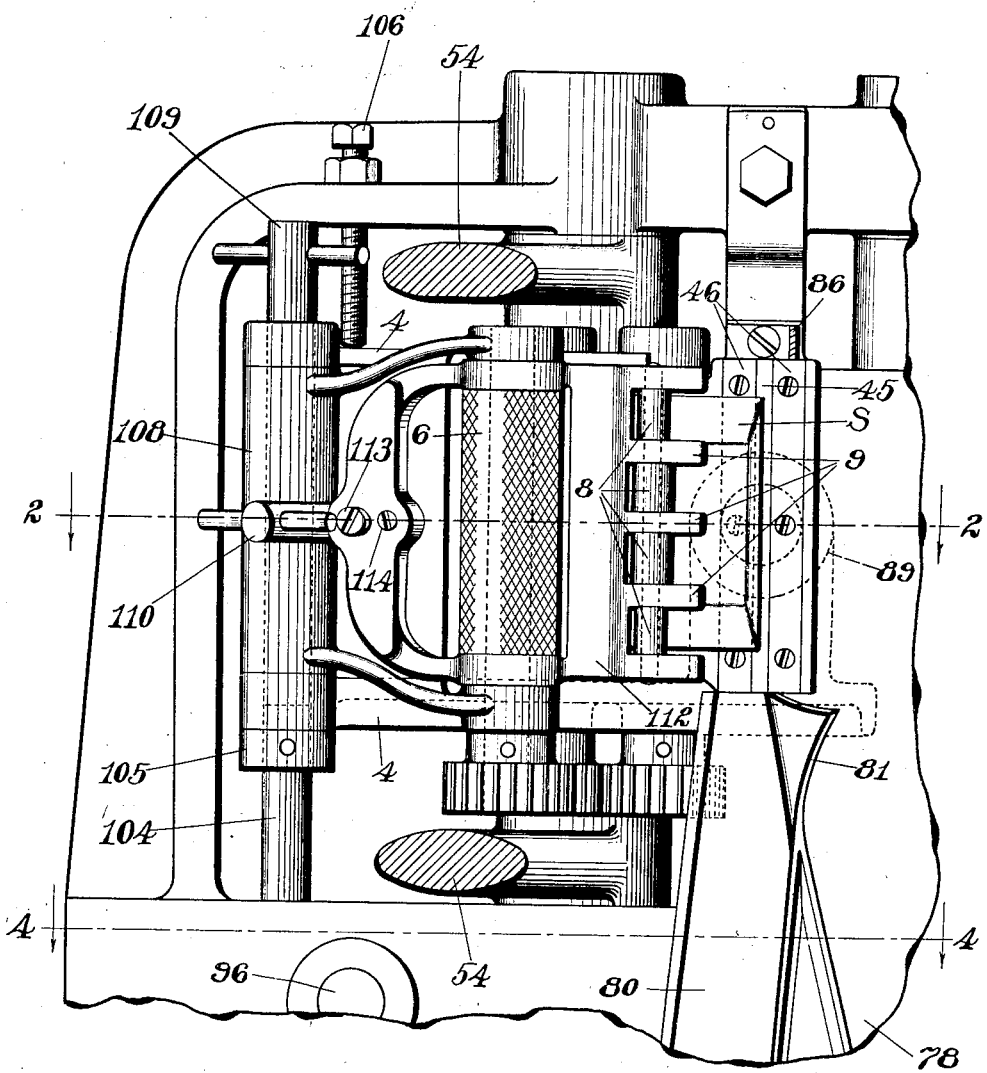
Fig. 5 is a vertical, cross sectional view taken substantially on the line 5—5, Fig. 2.
Figure 8:
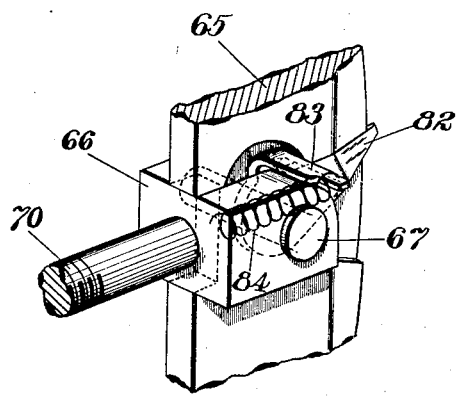
Fig. 8 is a perspective view showing a detail of construction.
Figure 9:
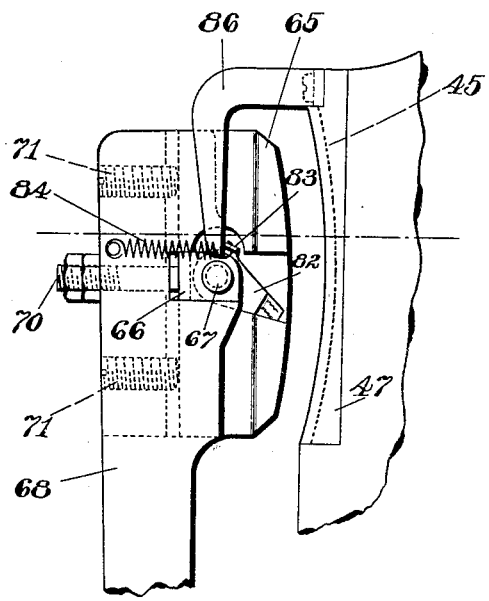
Fig. 9 is a side elevation of the parts shown in Fig. 8 and certain parts that coöperate therewith.

It will now be understood that, when the machine is in operation, the knives 50 and 51 and the presser blade 65 are moved toward and from the cutting block, the presser blade operating to press the strip of veneer against the block while the knives 50 and 51 cut through it to form a shank; and that between successive cutting operations the feeding mechanism above described feeds the required length of the strip of veneer across the face of the cutting block in readiness for the next cutting operation. Inasmuch as the cutting block and the presser blade which clamps the strip of veneer against this block are shaped to conform to the contour of the faces of the veneer against which they bear, respectively, the danger of splitting the veneer during the cutting operation is substantially eliminated. The idea of having the parts that engage the veneer shaped to conform to it is carried out somewhat in the feeding mechanism also since, as indicated in Fig. 5, the rolls 8 are made of different diameters so that they will bear effectually on the veneer at points which lie at different distances from the axis of the rolls. The bracket pieces 9, which separate these rolls, are also shaped, as best indicated in Fig. 2, to conform to the outer face of the strip of veneer and serve to guide the strip against the face of the cutting block 45. The feed rolls are set far enough apart so that, while they tend to straighten the veneer slightly and thus utilize the spring of the strip of veneer to feed it through the rolls, still they avoid any material danger of breaking the veneer. It will also be understood that, at each cutting operation, there is formed a shank W and a chip C, see Figs. 7 and 10. It is, of course, desirable to separate the chips from the shanks, and for this purpose two chutes 78 and 80, respectively (see Fig. 1) lead downwardly away from the cutting block and are separated at their upper ends by a curved partition plate 81 (see Figs. 1 and 5). This partition plate is so located that each shank, as it is formed, will tend to drop into the chute 78 at the right of the plate 81. The chips should drop into the chute 80 at the left of the plate 81 but they do not find their way as accurately into the proper chute as do the shanks, and accordingly a mechanism is here provided for guiding the chips into the proper chute. Referring particularly to Figs. 2, 8 and 9, it will be seen that a small blade 82 is pivoted on the stud 67 and is positioned in a recess formed for it in the side of the presser blade 65 which constitutes a carrier for said small blade. The blade 82 has an arm 83, see Fig. 8, projecting from it, to which is secured one end of a spring 84, the opposite end of said spring being fastened to the lever arm 68. This spring obviously tends to maintain the blade 82 in the position in which it is shown in Fig. 8, with its extreme end portion projecting slightly beyond the edge of the presser blade 65. Accordingly, when the lever 68 is swung forward to cause the presser blade 65 to bear against the veneer, the end of the blade 82 will pierce or stab the part of the strip lying between the knives 50 and 51 and which will form the next chip. Accordingly, when the knives 50 and 51 and the presser blade 65 move away from the cutting block 45 after completing the cutting operation, the chip last formed will remain impaled on the end of the blade or stabber 82 and will be moved away from the cutting block with the presser device. In order to remove the chip from the stabber 82, an overhanging arm 86 is secured to the frame just above the cutting block, and the end of this arm is curved downwardly, so that it lies in the path of movement of the arm 83, as the lever 68 swings away from the cutting block. The engagement of the arm 83 with the part 86 swings the stabber 82 about its pivot into the position in which it is shown in Fig. 9, thus withdrawing the point of the stabber behind the edge of the presser device 65 and pulling it out of the chip while throwing the chip downward. This stabber has in the meantime carried the chip into a position directly over a wide part of the chute 80 so that it can not escape falling into the chute intended for it. The curvature of the partition 81 tends to widen the upper end of this chute and thus to assist in directing the chips into it.

Figure 11:
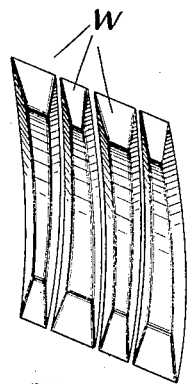
Fig. 11 is a perspective view further illustrating the method of forming tapered shanks.

When the machine is operating as above described the shanks formed will have parallel sides and will be what are called "straight" shanks. It is often desirable, however, to form tapered shanks; and this object is accomplished by tipping the supporting table 2 and the feeding mechanism about an axis lying substantially at right angles to the face of the cutting block 45 and intersecting the line of cut of the knives substantially at its center. For this purpose the bracket 4, which carries the table 2 and the feeding mechanism, is provided with a pair of trunnions which are mounted in bearings 88 and 89 formed in suitable parts of the machine frame; and mechanism is provided to rock the table and feeding mechanism alternately in opposite directions upon these trunnions between successive cutting operations. The axis of the trunnions lies substantially tangent to the pitch circles of the two beveled gears 16 and 18, through which the feeding mechanism is driven, and these gears have a free fit so that this rocking movement does not interfere in any manner with the operation of the feeding mechanism. The mechanism that effects this rocking movement is driven from the main shaft 22 of the machine and comprises a pinion 90 (see Figs. 4 and 6) rotating with said shaft and driving a gear 91 mounted on an adjacent shaft 92. Rotating with this gear is a cam 93 having a path in which a roll 94 is received. This roll is mounted on the lower end of an arm 95, the upper end of which is secured to a horizontal rock shaft 96 extending at right angles to the main shaft. Pinned to the rearward end of the rock shaft 96 is a short arm 98 (Fig. 6) and a link 99 connects the free end of this arm with a stud 100 projecting from a boss 101 provided on the bracket 4 at one side of the axis of the bearings 88 and 89. It will be obvious from an inspection of Figs. 4 and 6 that this mechanism is effective to rock the table 2 and the feeding mechanism which is rigid with the table. This rocking movement is so timed that during one cutting operation the feeding mechanism holds the strip S of veneer in the position in which it is indicated in dotted lines in Fig. 10, and while the knives are withdrawn, the feeding mechanism and table are angled or tipped to move the strip S into the position in which it is shown in full lines in said figure. Upon the next forward stroke of the knives they will cut out the chip C and form the tapered shank W. Fig. 11 shows a series of these tapered shanks and indicates the manner in which they are formed by this mechanism.

Figure 6:
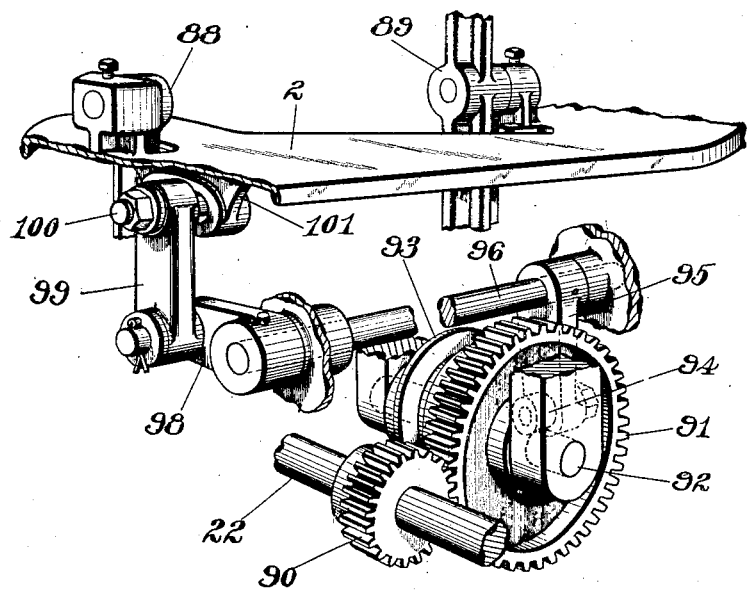
Fig. 6 is a perspective view showing certain parts of the mechanism that operates the work table.

Whenever it is desired to form straight shanks the mechanism that angles or tips the table 2 is rendered inoperative by removing the link 99, which, as shown in Fig. 6, is secured to the parts 98 and 100 merely by a nut and cotter pin. The table is then locked in a horizontal position by inserting a short stud 104 (Fig. 5) provided with a collar 105 between a stationary part of the frame and the bracket 4, the upper end of the stud entering a hole formed for it in the bracket 4 and the collar bearing against the bottom of the bracket. A bolt 106, also threaded through a stationary part of the machine frame, bears against the upper surface of the bracket 4 and clamps it against the collar 105 on the stud 104.

There is sometimes danger of the veneer becoming jammed in the feeding mechanism, due for instance to the presence of a bad knot, and it is therefore desirable to have ready access to the path that the veneer takes in traveling through the feeding mechanism. For this purpose the feed rolls 6 and 8 are mounted on studs that are carried by a removable bracket piece 108. This bracket is secured in its operative position by a removable pin 109 that slides through suitable apertures provided for it in the upper and lower arms of the bracket 4 and registers with the stud 104 above described. This construction allows the bracket 108 to swing on the pin 109 and a hand screw 110 bearing against this bracket and threaded into the part 4 clamps the bracket in its operative position. Whenever it is desired to remove the bracket, the screw 110 is threaded out, the pin 109 is removed, and the bracket carrying the rolls 6 and 8 with it may then be removed and any obstruction in the feeding mechanism may be cleared away.

It is obvious that the hand screw 110 may also be utilized to adjust the width of the space between the opposed feed rolls 5 and 6. In order to afford a similar adjustment for the rolls 8 relatively to the roll 7, the entire series of rolls 8 is mounted in a bearing piece 112 which is pivoted on the shaft of the feed roll 6; and two set screws 113 and 114 act on the rearward end of this bearing piece to adjust it about the axis of the roll 6. That is, the screw 113 extends loosely through the bracket piece 112 and is threaded into a web or flange connecting the upper and lower arms of the bracket 108 so that it tends to swing the rolls 8 away from the roll 7, while the screw 114 is threaded through the member 112 and bears against a part of the bracket 108 and tends to swing the rolls 8 toward the roll 7. One of these adjusting screws thus is opposed to the other in its action and they coöperate therefore to clamp the bearing piece in any desired position of adjustment relatively to the bracket that carries it.

The operation of the machine has been described so completely in connection with the foregoing description of construction that any further description of operation is believed to be unnecessary.

Although the machine selected to illustrate the preferred embodiment of the invention is shown and described as constructed for cutting either straight or tapered shanks, it will be understood that by the use of cutting knives of different forms the shapes of the shanks produced may be variously modified. By providing the machine with suitably curved knives for example, the machine may be adapted for cutting the well known type of shank which is relatively narrow in the middle and wide at both ends.

While the invention is described herein as embodied in a machine designed especially for use in manufacturing shanks, since the invention is of particular utility in this field, it is contemplated that the invention may be applied to the manufacture of articles other than shanks. Accordingly it should be understood that the invention is not limited to the specific use herein disclosed. It will also be understood that the invention is not limited to the conjoint use of all its features, and that its features may be embodied in many specific forms without departing from the spirit or scope of this invention.

Having thus described my invention, what I claim as new and desire to secure by Letters Patent of the United States is:

1. In a machine for cutting pieces from a strip of material curved in a plane transverse to its length, the combination of a cutting block, means for feeding the strip of material across said block, said block having a face shaped to conform substantially to the contour of the portion of said strip that bears against it, a pair of knives arranged to cut through the strip and against said block, and means for operating said knives.

2. In a machine for cutting pieces from a strip of material curved in a plane transverse to its length, the combination of a cutting block against which said strip rests, said block having a face shaped to conform substantially to the curvature of said strip, means for feeding said strip across said face, means coöperating with said block to cut said strip, and means conforming substantially to the curvature of said strip and bearing against it to guide it against said block.

3. In a machine for cutting pieces from a strip of material curved in a plane transverse to its length, the combination of a cutting block against which said strip rests, said block having a face shaped to conform substantially to the curvature of said strip, means for feeding said strip across said face, a pair of knives arranged to cut through said strip and against said block, a presser device operative to bear on said strip between said knives and press it against said block during the cutting operation, said knives and said presser device being shaped to conform substantially to the lateral curvature of said strip, and means for operating said knives and device.

4. In a machine for cutting pieces from a strip of sheet material, the combination of a cutting mechanism comprising a cutting block, means for feeding the strip of material to said mechanism, and means for angling said feeding mechanism relatively to said cutting mechanism about an axis lying substantially at right angles to the face of the cutting block between successive cuts of said mechanism to produce pieces wider at one end than at the other.

5. In a machine of the character described, the combination of a cutting block, means operative to feed a strip of material across the face of said block, a pair of knives mounted to cut through said strip against said block, and means operative to tip said feeding mechanism and strip alternately in opposite directions between successive cuts about an axis extending substantially at right angles to the face of said cutting block.

6. In a machine of the character described, the combination with a cutting block, of a feeding mechanism operative to feed a strip of material across the face of said block, said feeding mechanism being mounted for movement about an axis extending transversely of the face of said cutting block, and driving means for said feeding mechanism including a pair of gears meshing with each other and having their pitch circles lying substantially tangent to said axis.

7. In a machine of the character described, the combination of a cutting block, means acting intermittently to feed a strip of material across the face of said block, a pair of knives mounted to cut through said strip and against said block toward a common line of cut lying substantially at the face of said block, and driven means acting to tip said feeding mechanism and strip alternately in opposite directions between successive cuts about an axis intersecting said line of cut and extending at substantially right angles to the face of said cutting block.

8. In a machine for cutting shanks from a strip of veneer, the combination of a cutting block, means for feeding a strip of veneer across said block, a pair of knives arranged to cut through the veneer and against said block, means for operating said knives, and means for angling said feeding mechanism relatively to said knives between successive cuts of the knives, whereby the knives will be caused to form shanks each wider at one end than at the other.

9. In a machine for cutting shanks from a strip of veneer, the combination with a cutting mechanism, of a feeding mechanism operative to advance to the cutting mechanism between successive cuts the length of veneer required for the next shank, and freely movable manually operable means for controlling the operation of the feeding mechanism independently of the rest of the machine.

10. In a machine of the character described, the combination with a cutting block, of a feeding mechanism including rolls operative to engage a strip of material and feed it across the face of said block, means for driving said rolls, a bracket for supporting a plurality of said rolls, and means for detachably securing the bracket in operative position, said bracket and rolls lying in front of the path of travel of said strip and being mounted for ready removal from the machine to afford free access to said path.

11. In a machine for cutting shanks from a strip of veneer, the combination of a cutting mechanism and a feeding mechanism operative to advance to the cutting mechanism between successive cuts the length of veneer required for the next shank, said feeding mechanism comprising a bracket and two rolls mounted thereon, said bracket lying at one side of the path of travel of the veneer and being mounted for movement to afford free access to said path.

12. In a machine of the character described, the combination with means for cutting a strip of material to form an article and a chip, of means operative to engage the chip during the cutting operation and to carry it away from the point of operation of the cutting means in a direction transverse to that taken by the article, and mechanism for operating said chip engaging means during its movement away from the cutting means to cause it to release the chip.

13. In a machine of the character described, the combination with means for cutting a piece from a strip of material, of means for stabbing said piece and moving it away from the point of operation of the cutting mechanism and means for operating the stabbing means during said movement to cause said piece to be removed therefrom.

14. In a machine of the character described, the combination with means for cutting a strip of material to form an article and a chip, of separate receiving means for the chip and article into which they drop under the influence of gravity, and means for moving one of said parts laterally away from the point of operation of the cutting means and into position to insure its entrance into the proper receiving means before it is allowed to drop.

15. In a machine of the character described, the combination with means for cutting a strip of material to form an article and a chip, of a stabber operative to stab one of the parts cut from said strip of material and to move the part so stabbed away from the point of operation of the cutting mechanism, a carrier upon which said stabber is mounted and means for moving the stabber relatively to said carrier to eject said detached part of the strip.

16. In a machine of the character described, the combination with a cutting block, means for feeding a strip of material across the face of said block, and means for cutting through said strip of material against said block, of a movable presser device arranged to bear on said strip, a stabber carried by said device for engaging a piece of the material cut from the strip, and means for moving the stabber relatively to said device to disengage said piece.

17. In a machine of the character described, the combination with a cutting block and means for feeding a strip of material across the face of said block, of a pair of knives mounted to reciprocate toward and from said block and operative to cut through said strip, a movable presser blade arranged to bear on said strip between said knives during the cutting operation, and a stabber carried by said blade and operative to pierce a part of the strip severed by said knives, and means for removing the part so severed from said stabber.

18. In a machine of the character described, the combination with a cutting block and means for feeding a strip of material across the face of said block, of a pair of knives mounted to reciprocate toward and from said block and operative to cut through said strip, a presser blade mounted for movement toward and from said cutting block and operative to bear on said strip between said knives during the cutting operation, a stabber pivoted to said blade and operative to pierce the part of the strip between said knives, and means for swinging said stabber about its pivot after said blade has withdrawn from the cutting block.

19. In a machine of the character described, the combination with a cutting block and means for cutting a strip of material on the block, of a carrier movable toward and from the block, a stabber pivoted on said carrier in position to engage a piece cut from the strip, and a stationary member for swinging said stabber during the movement of the carrier away from the block to cause said piece to be ejected from the machine.

20. In a machine of the character described, the combination with a cutting block, of mechanism for feeding a strip of material across the face of said block, means for cutting articles from the strip, means for tipping said feeding mechanism and strip alternately in opposite directions between successive cuts to change the angular relation of the strip to the cutting means, and driving means for the feeding mechanism arranged to remain in continuous operative relation to said mechanism as the mechanism is tipped to different positions.

21. In a machine for cutting pieces from a strip of sheet material, the combination of a cutting mechanism constructed and arranged to cut completely across the strip at each operation, means for feeding the strip of material to said mechanism, and means for angling said feeding mechanism relatively to said cutting mechanism between successive cuts of said mechanism in such a way as to produce pieces wider at one end than at the other.

22. In a machine for cutting pieces from a strip of sheet material, the combination of a cutting mechanism, means for feeding the strip of material to said mechanism, and means for moving said feeding mechanism relatively to said cutting mechanism, between successive cuts of said cutting mechanism, in such a way as to produce pieces wider at one end than at the other.

23. In a machine for cutting shanks from a strip of veneer, the combination with cutting means, of feeding means operative to advance to the cutting means between successive cuts the length of veneer required for the next shank and comprising work engaging mechanism and operating means therefor, and manually controllable means for throwing the operating means into or out of operation at the will of the operator independently of the rest of the machine, said mechanism being constructed and arranged to remain in engagement with the work during the described adjustments of the operating means.

In testimony whereof I have signed my name to this specification.

HARRISON H. EATON.